United States Patent

Kappele et al.

[11] Patent Number: 6,063,834
[45] Date of Patent: May 16, 2000

[54] WET-RUB RESISTANT INK COMPOSITIONS

[75] Inventors: William David Kappele, Georgetown; Anna Marie Pearson, Richmond; Ajay Kanubhalsuthar, Lexington, all of Ky.

[73] Assignee: Lexmark International, Inc., Lexington, Ky.

[21] Appl. No.: 08/987,185

[22] Filed: Dec. 8, 1997

[51] Int. Cl.$^7$ ................................................. C09D 11/02
[52] U.S. Cl. ....................... 523/160; 523/161; 106/31.27; 106/31.6
[58] Field of Search ..................... 523/160, 161; 106/31.27, 31.6

[56] References Cited

U.S. PATENT DOCUMENTS

| | | | |
|---|---|---|---|
| 3,787,232 | 1/1974 | Mikofavly et al. | 117/155 |
| 4,021,397 | 5/1977 | Shah | 524/419 |
| 4,066,585 | 1/1978 | Schepp et al. | 260/18 N |
| 4,334,932 | 6/1982 | Roueche | 524/191 |
| 4,692,502 | 9/1987 | Uebele et al. | 526/193 |
| 4,830,671 | 5/1989 | Frihart et al. | 106/27 |
| 4,921,899 | 5/1990 | Phan et al. | 524/513 |
| 5,075,364 | 12/1991 | Phan et al. | 524/190 |
| 5,158,606 | 10/1992 | Carlick et al. | 524/145 |
| 5,196,470 | 3/1993 | Anderson et al. | 524/379 |
| 5,242,997 | 9/1993 | Kohn et al. | 525/534 |
| 5,468,591 | 11/1995 | Pearce et al. | 430/201 |
| 5,523,335 | 6/1996 | Whyzmuzis et al. | 523/160 |
| 5,536,306 | 7/1996 | Jonson et al. | 106/31.49 |
| 5,571,311 | 11/1996 | Belmont et al. | 106/20 R |
| 5,573,834 | 11/1996 | Stahl | 428/195 |
| 5,594,044 | 1/1997 | Yang | 523/160 |
| 5,631,309 | 5/1997 | Yanagi et al. | 523/160 |
| 5,661,197 | 8/1997 | Villiger et al. | 523/161 |
| 5,679,724 | 10/1997 | Sacripante et al. | 523/161 |
| 5,719,204 | 2/1998 | Beach et al. | 523/161 |
| 5,814,685 | 9/1998 | Satake et al. | 523/201 |

FOREIGN PATENT DOCUMENTS

| | | |
|---|---|---|
| 0 867 484 | 9/1996 | European Pat. Off. . |
| 0 796 901 A2 | 9/1997 | European Pat. Off. ........ C09D 11/00 |
| 0 851 010 | 7/1998 | European Pat. Off. . |
| 0 851 011 | 7/1998 | European Pat. Off. . |
| 0 851 012 | 7/1998 | European Pat. Off. . |
| 0 851 013 | 7/1998 | European Pat. Off. . |
| 0 851 014 | 7/1998 | European Pat. Off. . |
| 0 859 037 | 8/1998 | European Pat. Off. . |

*Primary Examiner*—Vasu Jagannathan
*Assistant Examiner*—Callie E. Shosho
*Attorney, Agent, or Firm*—Jackie A. Zurcher; John A. Brady; Jacqueline M. Daspit

[57] ABSTRACT

Wet-rub resistant ink compositions are described and the ink compositions have a binder material or binder composition which may be prepared from monomeric precursors which include vinyl halides, acrylates, alkylol amides and urethanes.

43 Claims, No Drawings

WET-RUB RESISTANT INK COMPOSITIONS

FIELD OF THE INVENTION

This invention relates to novel ink compositions. More particularly, the instant invention is directed to ink compositions comprising binder materials, whereby the ink compositions may be used to make print images which display wet-rub resistance.

BACKGROUND OF THE INVENTION

Ink jet printing is a conventional technique by which printing is normally accomplished without contact between the printing apparatus and the medium on which the desired print characters are deposited. Such printing is accomplished by ejecting ink from an ink jet printhead of the printing apparatus via numerous methods which employ, for example, pressurized nozzles, electrostatic fields, piezoelectric elements and/or heaters for vapor phase bubble formation.

The ink compositions used in ink jet printing typically employ water, colorants and low molecular weight water miscible solvents. The colorants which may be employed include dyes or pigments. Pigments are often preferred and they are generally characterized as colorants that are not soluble in the liquid portion of the ink composition. Such ink compositions are, however, often deficient since print images prepared therefrom do not display wet-rub resistant properties. This means that print images made from such ink compositions typically smear when, for instance, the images are rubbed under pressure, wetted and/or subjected to commercially available highlighting or fluorescent markers.

It is of increasing interest to develop ink compositions that result in print images which resist such smearing. Moreover, it is of increasing interest to develop wet-rub resistant ink compositions that do not adversely interfere with parts of printing apparatuses. This invention, therefore, is directed to novel ink compositions which comprise binder materials, said novel ink compositions unexpectedly: result in print images which display wet-rub resistance; do not interfere with parts of printing apparatuses; display optical densities greater than about 1.18 (for black inks); and display good print quality (which is defined to mean substantially no print feathering or satellites).

DESCRIPTION OF THE PRIOR ART

Efforts for preparing ink compositions have been disclosed. In U.S. Pat. No. 5,223,028, assigned to Lexmark International, Inc., waterfast aqueous inks are described.

Still other efforts have been made to prepare ink compositions. In U.S. Pat. No. 5,536,461, assigned to Lexmark International, Inc., inks used in multi-colored printing are described.

SUMMARY OF THE INVENTION

In a first aspect, the instant invention is directed to a binder material for ink compositions, wherein said binder material is a material capable of forming a film on a solid substrate.

In a second aspect, the instant invention is directed to a binder composition for ink compositions, said binder composition comprises:
a) a binder material capable of forming a film on a solid substrate; and
b) with or without an ink component.

In a third aspect, the instant invention is directed to an ink composition comprising the binder material, binder composition (as described above) or mixture thereof.

DETAILED DESCRIPTION OF THE PREFERRED EMBODIMENTS

"Binder material" as used herein, is defined to mean any material capable of forming a thin film on a solid substrate, like a print substrate. The film may, for example, adhere to the solid substrate. Moreover, when an ink composition is prepared with the binder material or binder composition, the binder material typically encapsulates and/or covers colorants employed in the ink composition after the ink composition is, for example, printed on the solid substrate. The preferred solid substrate is paper.

The binder material employed in this invention is often a polymeric material comprising at least one structural unit selected from the group consisting of:

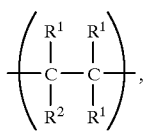

and

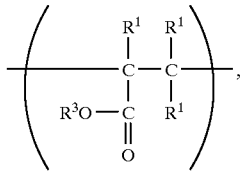

wherein i) each $R^1$, independently, and $R^2$ is a hydrogen, halogen, $C_{1-6}$ alkyl, aryl, nitrile group (CN), nitro group ($NO_2$), or sulfonate group ($SO_3R^3$); and ii) each $R^3$ is independently a hydrogen or $C_{1-6}$ alkyl. Preferably $R^1$ is hydrogen, $R^2$ is chlorine and $R^3$ is hydrogen.

Still other binder materials which may be employed in this invention include those comprising the structural unit:

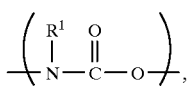

wherein $R^1$ is as previously defined, and preferably hydrogen.

The preferred binder materials employed in this invention include polymeric materials comprising the structural units represented by I and II, and further comprising the structural unit represented as:

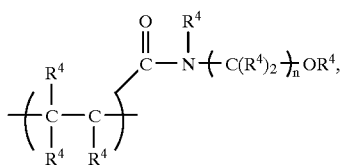

wherein each $R^4$ is independently a hydrogen, halogen, $C_{1-6}$ alkyl or aryl and n is an integer from about 1 to about 6, preferably 4. Preferably $R^4$ is hydrogen.

The binder materials employed in this invention, for example those comprising structural units represented by I and II, are generally only limited to the extent that they may be used to encapsulate and/or cover colorants employed in ink compositions. The binder materials (copolymers) comprising structural units represented by I and II may therefore be, for example, block polymers, diblock polymers, triblock polymers or random polymers, including mixtures thereof.

The preferred binder materials, those comprising structural units represented by I, II and IV, are typically limited only to the extent that they may be used to encapsulate and/or cover colorants employed in ink compositions. Therefore, the preferred binder materials (terpolymers) may be triblock or random terpolymers.

The binder materials comprising structural units represented by III, may be, for example, homopolymers; copolymers including terpolymers, random or block, and they may be present in inks having binder materials represented by structural units I, II and/or IV.

The most preferred binder material employed in this invention is one having structural units I, II and IV wherein $R^1$ is hydrogen, $R^2$ is chlorine, $R^3$ is butyl and $R^4$ is hydrogen.

The most preferred binder material typically comprises between about 60.0 to about 99.8 weight percent of the structural units represented by I, about 0.1 to about 30.0 weight percent of the structural units represented by II, and about 0.1 to about 10.0 weight percent of the structural units represented by IV, including all ranges subsumed therein, wherein weight percent, in this instance, is defined to mean the weight percent based on the total weight of all structural units represented by structural units I, II and IV.

Often, however, the most preferred binder material comprises between about 92.0 to about 99.0 weight percent of the structural units represented by I, about 0.5 to about 5.0 weight percent of the structural units represented by II, and 0.5 to about 3.0 weight percent of the structural units represented by IV, including all ranges subsumed therein.

It is noted herein that while examples of the preferred binder materials of this invention comprise structural units represented by I, II and IV, the binder materials may consist essentially of or consist of the same. Moreover, when the binder materials comprise the structural units represented by I, II and IV, they may also comprise up to about 65.0 weight percent (based on total weight of the binder material) of any combination of structural units derived from polymerizable comonomers selected from the group consisting of conjugated dienes such as butadiene, isoprene and piperylene; α-olefins such as ethylene, propylene, isobutylene, butene-1,4-methylpentene-1; vinyl esters such as vinyl acetate; vinyl aromatics such as styrene, α-methyl styrene, vinyl toluene, vinyl naphthalene; alkyl vinyl ethers such as methyl-vinyl ether, isobutyl vinyl ether, n-butyl vinyl ether and isobutyl vinyl ether; N-alkoxyalkyl amides of α,β-olefinically unsaturated carboxylic acids such as N-methoxymethyl acrylamide, N-methoxyethyl acrylamide, N-butoxymethyl acrylamide, N-butoxymethyl methacrylamide and the like; amides of α,β-olefinically unsaturated carboxylic acids such as acrylamide, methacrylamide, N-methyl acrylamide, N-t-butyl acrylamide, N-methyl methacrylamide, N-ethyl methacrylamide, diacetone acrylamide and the like; acrylonitrile, methacrylonitrile and cyanoalkyl acrylates such as α-cyanomethyl acrylate and the α-,β- and γ-cyanopropyl acrylates; esters of α,β-olefinically unsaturated carboxylic acids such as methyl acrylate, ethyl acrylate, methyl methacrylate, 2-ethylhexyl acrylate, cyclohexyl acrylate and phenyl acrylate; polyfunctional monomers such as methylene bisacrylamide, ethyleneglycol dimethacrylate, diethyleneglycol diacrylate, allyl pentaerythritol and divinyl benzene; bis(β-haloalkyl) alkenyl phosphonates such as bis(β-chloroethyl) vinyl phosphonate; and the like.

"Binder composition" as used herein is defined to mean, for example, an emulsion or solution composition comprising any mixture or combination of the above-described binder material. The binder composition may be added to an ink composition, and it may optionally be combined and sold with an ink component to form an additive for ink compositions. The binder composition (whether emulsion or solution) typically comprises about 2.0 to about 50.0, preferably from about 4.0 to about 30.0, and most preferably, from about 6.0 to about 20.0 weight percent binder material based on total weight of the binder composition, including all ranges subsumed therein.

"Ink component" as used herein is defined to mean any additive employable in an ink composition capable of being used to make an image on a substrate.

The ink components which may be combined with the binder material in the binder composition include, for example, at least one member selected from the group consisting of a penetrant like 1,2-hexanediol, acetylene derived compounds, 1,2-octanediol, 2-(2-butoxyethoxy) ethanol, 1-cyclohexyl- 2-pyrrolidinone, 2-methyl-2-propyl-1,3-propanediol, n-propanol and the like; a humectant such as glycerol, sorbitol, ethylene glycol ethers, propylene glycol ethers and the like; a biocide like 2-halo-2-halomethyl glutaronitrile, gluteraldehyde, 4–5, polymethylene-4-isothiazolin-3-one, 4,5-dichloro-1,2-dithiol-3-one and the like; a surfactant like poly(oxyethylene), stearylamines, monostearates, polysiloxanes, lauryl sulfates, acetylene based surfactants and the like; an anti-kogation agent; a buffer; a chelating agent like ethylenediaminetetraacetic acid tetrasodium salt; an anti-curling agent; an anti-bleed agent; aqueous and non-aqueous solvents; and colorants. Such ink components are commercially available.

Still other ink components which may be employed in this invention include, for example, preferred solvents like bis-terminal diols and lactams.

The bis-terminal diols which may be employed in this invention include those having the formula:

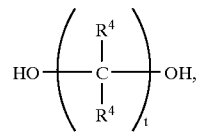

wherein $R^4$ is as previously defined, and t is an integer from about 3 to about 7, preferably 3.

The lactams which may be employed in this invention include those having the formula:

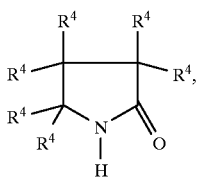

wherein $R^4$ is as previously defined. Regarding the bis-terminal diols and the lactams, $R^4$ is preferably hydrogen.

The binder materials employed in this invention are commercially available (can be purchased, for example, as emulsions or solutions or isolated therefrom) and/or made by art recognized polymerization techniques. Commercially available emulsions include VYCAR™ PVC emulsions available from B.F. Goodrich Co., and commercially available solutions, including polyurethane comprising solutions (which may be converted to emulsions), are available from Eastern Color & Chemical, Co. The art recognized polymerization techniques include, for example, emulsion polymerizations and solution polymerizations.

When the binder materials employed in this invention comprise structural units as depicted by, for example, I, II, and/or IV, the binder materials are preferably synthesized by emulsion polymerization techniques. The emulsion polymerization techniques generally employ, for example, a monomer, a dispersing medium, an emulsifying agent and a water-soluble initiator. Moreover, when the binder materials employed in this invention comprise structural units represented by formula III, they may be made by solution polymerization techniques which generally are carried out in the presence of heat and in the absence of catalysts. Typically, the employment of catalysts is not preferred because synthesis of urethane derived polymers often results in many side reactions.

More detailed descriptions of the polymerization of the binder materials which may be employed in this invention are found, for example, in *Principles of Polymerization* by George Odian, McGraw Hill Book Company, 1970, and U.S. Pat. No. , 3,787,232, the disclosures of which are incorporated herein by reference.

The preferred solvents employed as ink components in this invention are commercially available. Additionally, the terminal diols may be made, for example, by subjecting a malonic ester to a strong reducing agent (like $LiAlH_4$) under acidic conditions. The lactams employed in this invention can be made, for example, by reactions which transform amides into cyclic compounds.

The preferred solvents may be employed either alone or in combination with one another. When a combination (mixture) of the preferred solvents is employed, the mixture is often in a weight ratio of about 20:80 to about 80:20 terminal diol to lactam. Preferably, however, the mixture is a weight ratio of about 45:55 to about 55:45 terminal diol to lactam.

The thickness of the film formed by the binder materials on the solid substrates is generally limited only to the extent that the film results in print images which display wet-rub resistance. Often, however, the film formed is greater than about 10 nanometers and less than about 15 microns, including all ranges subsumed therein.

There is essentially no limitation with respect to the inks which may employ the binder material or binder compositions of this invention. The only limitation is that the resulting inks may be used for printing on a substrate. Inks which employ the binder materials or binder compositions of this invention may, therefore, be dye based, pigment based, aqueous or nonaqueous.

The inks which may be prepared in this invention, whether dye based or pigment based, may comprise art recognized ink additives. Such art recognized additives include, for example, dispersants; humectants like glycerol and sorbitol; biocides; fungicides; bacteriocides; penetrants like 1,2-hexanediol and acetylene derived compounds; surfactants like polyorganosiloxanes; anti-kogation agents; anti-curling agents; buffers; chelating agents, and anti-bleed agents. Such art recognized additives may be used in addition to, or in the absence of, the ink components present in the binder compositions described in this invention.

There is no limitation with respect to the pigments that may be employed in this invention other than that they are capable of resulting in an ink. Any of the commonly employed organic or inorganic pigments may be used. An illustrative example of the pigments which may be employed in this invention includes azo pigments such as condensed and chelate azo pigments; polycyclic pigments such as phthalocyanines, anthraquinones, quinacridones, thioindigoids, isoindolinones, quinophthalones. Still other pigments which may be employed include, for example, nitro pigments, daylight fluorescent pigments, carbonates, chromates, titanium oxides, zinc oxides, iron oxides and carbon black. Such pigments may be prepared via conventional techniques and many are commercially available.

The amount of pigment employed in the instant invention is limited only to the extent that the amount results in an ink capable of printing on a substrate. Often the amount of pigment employed is from about 0.2 to about 10.0 percent by weight and preferably from about 0.5 to about 6.0 percent by weight and most preferably about 1.0 to about 5.0 percent by weight based on total weight of the ink composition, including all ranges subsumed therein.

There is no limitation with respect to the dye compounds which may be employed in this invention other than that they are capable of resulting in an ink. An illustrative list of such dyes includes, for example, nitro dyes; nitroso dyes; azo dyes such as monoazo or polyazo dyes, mordant dyes, preformed metal complexes, pyrazolones and stilbenes; thiazoles; diphenylmethanes; triphenylmethanes such as triamines and phenols; xanthenes; acridines; azines; oxazines; thiazines; quinones and indigoids. Such dyes are commercially known and often commercially available. Many of these dyes are described in, for example, *The Chemistry of Synthetic Dyes,* by K. Venkataraman, Academic Press Inc., 1953.

The amount of dye compound employed is limited only to the extent that the resulting inks may be used to print on a substrate. Often, the amount of dye compound employed is from about 0.2 to about 20.0 percent by weight and, preferably, from about 0.5 to about 15.0 percent by weight and, most preferably, from about 1.0 to about 10.0 percent by weight based on total weight of the ink composition, including all ranges subsumed therein.

When making pigment based inks, it is desirable to employ dispersants in the inks to prevent the pigment from settling and flocculating in the ink composition. There is essentially no limitation with respect to the amount of dispersant employed other than that the amount of dispersant used results in an ink composition capable of being printed on a substrate. When making a pigment based ink, typically from about 0.05 to about 7.0, and preferably, from about 0.1 to about 6.0, and most preferably, from about 0.2 to 4.0 percent by weight of dispersant is employed based on total weight of the ink composition, including all ranges subsumed therein.

There is essentially no limitation with respect to the dispersants which may be employed in this invention. In fact, any non-polymeric or polymeric dispersant which may be used to make a pigment based ink composition may be employed in this invention. The often preferred dispersants are polymeric dispersants. An illustrative list of such polymeric dispersants includes random, block and branched polymers, whereby the polymers may be anionic, cationic or nonionic in nature. The polymeric dispersants typically have hydrophilic segments for aqueous solubility and hydrophobic segments for pigment interaction. Moreover, polymeric dispersants as used herein are meant to include homopolymers, copolymers (including terpolymers), immiscible blends and miscible blends.

Since the polymeric dispersants in this invention generally are limited to the extent that they are capable of dispersing a pigment in an ink composition, the precursor units which may be used to make such polymeric dispersants are not limited. Precursor, as used herein, is meant to include monomeric and macromeric units.

A general list of the monomeric units which may be employed to make such polymeric dispersants include, for example, acrylic monomers, styrene monomers and monomers having amine groups. Illustrative examples of the monomers which may be employed include acrylic and methacrylic acid, acrylamide and methacrylamide.

The polymeric dispersants often employed tend to be any of those which are commercially available as well as the polymeric dispersants which may be made via conventional techniques which include, for instance, anionic, group transfer or free radical polymerizations of monomeric units.

The often preferred polymeric dispersants which may be employed in this invention are random terpolymers prepared from three precursors. The most preferred precursors include monomeric and macromeric precursors, including at least one member selected from the group consisting of acrylates and methacrylates, at least one member selected from the group consisting of acryloyl- and methacryloyl-terminated polydialkylsiloxanes and at least one member selected from the group consisting of stearyl acrylate, stearyl methacrylate, lauryl acrylate and lauryl methacrylate. Dispersants prepared with methacrylate, methacryloyl-terminated polydimethylsiloxane and stearyl methacrylate (22:1:1 molar ratio, respectively) are the most preferred.

The polymeric dispersants prepared from these precursors may be made by polymerizing the monomeric and macromeric precursors via art recognized techniques which include free radical polymerizations. A more detailed description of the most preferred polymeric dispersants which may be employed in this invention may be found in U.S. patent application Ser. Nos. 08/578,138 and 08/667,269, the disclosures of which are incorporated herein by reference.

There is no limitation with respect to how the ink compositions are made in this invention. Essentially, the components (e.g., pigment, biocide, solvent binder material and/or binder composition, water) of the inks are, for example, mixed, stirred or agitated using any art recognized technique. The inks may be made at ambient temperature, atmospheric pressure or at any pressure or temperature variations which may result in ink formation. The addition of the components is not limited to any particular order, with the proviso that the resulting composition is one which may be employed to print on a substrate.

None of the conventional processing steps is meant to be ignored when preparing the ink compositions of this invention. Therefore, for example, it is within the scope of this invention to grind pigments to their desired particle/agglomerate sizes via art recognized milling processes. It is also within the scope of this invention to mix the pigments with the polymeric dispersants of choice prior to combining the pigments with any other components of the inks.

When the preferred solvents are employed in the ink compositions, the terminal diols and/or lactams typically make up about 10.0 to about 60.0, and preferably, from about 20.0 to about 50.0, and most preferably, from about 25.0 to about 35.0 weight percent of the total weight of the ink composition, including all ranges subsumed therein. Such preferred solvents unexpectedly result in cost effective maintainable ink compositions having acceptable dry times.

Any other additives which may be employed in the inks of this invention may be added in the amounts/ranges typically found in the art. The balance of the ink compositions described herein comprises water if an aqueous ink composition is desired. If a non-aqueous ink composition is desired, the balance of the ink compositions will comprise, for example, oils in lieu of water. Such oils are generally not limited and an illustrative list includes mineral oil, tung oil, soybean oil, mixtures thereof and the like.

The following Examples are provided to illustrate and facilitate the understanding of this invention. The Examples are not intended to be a restriction of the scope of the invention. All products obtained may be confirmed via art recognized techniques which include proton and carbon-13 nuclear magnetic resonance spectroscopy. Optical density was determined by using a commercially available densitomer, and maintenance was determined by analyzing, visually, print samples made with an ink jet print cartridge (loaded with the ink compositions made in the Examples) that sat idle and uncapped for 1 hour and 6 hour time intervals. Acceptable means that the nozzles of the printhead nozzle plate remained unclogged and that no nozzle dropout was detected after printing. Dry times were determined by printing print samples and applying a clean piece of paper over the print samples while calculating (with a stop watch) the time it took for no ink to transfer from the print samples to the clean pieces of paper. All printing was performed with a commercially available Lexmark International, Inc. 2050 Ink Jet Printer. Wet-rub resistances were calculated by using a drawn down procedure (#10 wire wound rods). Ink was drawn down on plain paper followed by rubbing each print sample with a damp towel at 1 hour, 24 hour and 48 hour intervals. Analysis of ink smear at each interval was determined by visually inspecting ink smear using a 1 to 7 scale, wherein 1 is defined to mean no ink smearing at any interval and 7 is defined to mean ink smearing at all intervals.

EXAMPLE 1

A reaction vessel was charged with a solution of methacrylic acid 22.8 g (265 mmol), monomethacryloxypropyl-terminated polydimethylsiloxane (PDMS-MA) 7.84 g (8.7 mmol, MW 900), stearyl methacrylate 2.95 g (8.7 mmol), 1-dodecanethiol 2.06 g (9.9 mmol), dimethyl 2,2-azobisisobutyrate 0.64 g (2.84 mmol) and isopropyl alcohol 100 mL. The resulting mixture was degassed with argon (done by repeated partial evacuation followed by argon backfill using a Firestone Valve) then heated to 70° C. for 16 hours. The mixture was allowed to cool to about room temperature and subsequently added slowly to 1.0 L of hexane while stirring. The resulting solid product (polymeric dispersant) was isolated by vacuum filtration and dried in vacuum overnight at 80° C. The yield of the reaction was about 85%. The dried polymeric dispersant (the preferred dispersant in this invention) was characterized by proton NMR and GPC.

A stock solution of the polymeric dispersant was prepared by charging a 400 mL beaker, on a hot plate with a magnetic stirrer, with 40.0 g of deionized water. Added to the beaker with deionized water was 12.0 g of dried polymeric dispersant and 18.0 g of 20% KOH. The resulting mixture was heated to about 50 C. for about 2 hours. The pH of the mixture was adjusted to 7.5 by the addition of 20% KOH. Deionized water was then added to the mixture to bring the weight of the resulting solution to 100.0 g (12% polymeric dispersant).

A beaker was then charged with 133.33 g of the polymeric dispersant solution prepared above, 202.67 g of deionized water and 64.0 g of carbon black. The contents were stirred with a commercial mixer. The resulting mixture was then added to a grinding mill having 0.8 mm yttrium coated zirconium beads. The mixture was ground for about 90 minutes, resulting in a carbon black concentrate.

A second beaker was charged with 10.0 g of polyethylene glycol having a weight average molecular weight of about 400. 10.0 g of 1,3-propanediol were then added while stirring with a magnetic stir bar. After a homogeneous mixture resulted, 61.05 g of water were added while stirring. To the resulting mixture, 0.20 g of commercially available biocide solution having 1,2-benzisothiazolin-3-one were added with stirring resulting in an ink vehicle.

A third beaker was charged with 18.75 g of the carbon black concentrate prepared above, and the entire ink vehicle produced above was slowly added while stirring. The resulting composition was filtered to 1.2 microns using a commercially available pressurized filtration apparatus having a series of disk filters. The resulting filtered solution is a commercially available black ink composition. The black ink composition displayed acceptable maintenance properties, had an optical density of about 1.36, desired dry times (about 19 seconds on Hammermill Tidal® DP paper) and a wet-rub resistance of 7.

EXAMPLE 2

The ink composition of Example 2 was made in a manner similar to the one described in Example 1 except that no polyethylene glycol was employed, 30.0 g of 1,3-propanediol was used, 45.5 g of water were added, 10.12 g of VYCAR™ 460x46 (commercially available from B.F. Goodrich, Co.) were added, 14.38 g of carbon black concentrate were used and the resulting composition was filtered to 8.0 microns. The resulting ink composition displayed acceptable maintenance properties, an optical density of about 1.29, desired dry times and a wet-rub resistance of 3.

EXAMPLE 3

The ink composition of Example 3 was made in a manner similar to the one described in Example 2 except that 30.0 g of 2-pyrrolidinone were used in lieu of 30.0 g of 1,3-propanediol. The resulting ink composition displayed very poor maintenance properties, an optical density of about 1.19, desired dry times and a wet-rub resistance of 2.

EXAMPLE 4

The ink composition of Example 4 was prepared in manner similar to the one described in Example 2 except that 15.0 g of 2-pyrrolidinone and 15.0 g of 1,3-propanediol were used in lieu of 30.0 g of 1,3-propanediol. The resulting ink composition displayed acceptable maintenance properties, an optical density of 1.26, desired dry times and wet-rub resistance of 1.

EXAMPLE 5

The ink composition of Example 5 was made in a manner similar to the one described in Example 2 except that 20.0 g of 1,3-propanediol and 10.0 g of 2-pyrrolidinone were used in lieu of 30.0 g of 1,3-propanediol, 8.1 g of VYCAR™ 460x46 were used and C.I. Pigment Yellow 74 was used in lieu of carbon black. The resulting yellow ink composition displayed less than acceptable maintenance properties (acceptable for at least about 20 minutes), desired dry times and a wet-rub resistance of 2.

We claim:

1. An ink composition comprising:
   a) a colorant;
   b) a solvent selected from the group consisting of:

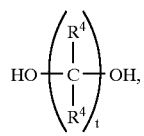 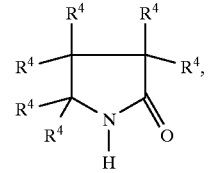

and mixtures thereof;
wherein each $R^4$ is independently a hydrogen, halogen, $C_{1-6}$ alkyl or aryl; and and t is an integer from about 3 to about 7; and
   c) a binder composition comprising a binder material comprising a structural unit selected from the group consisting of:

(I)

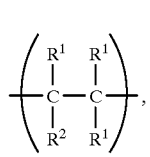

(II)

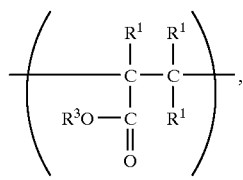

(III)

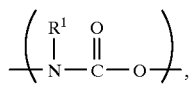

(IV)

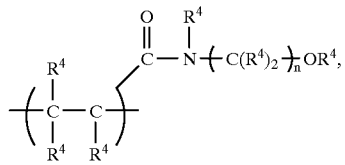

and mixtures thereof, wherein
   i) each $R^1$ is independently a hydrogen, halogen, $C_{1-6}$ alkyl, aryl, nitrile group, nitro group, or sulfonate group;
   ii) $R^2$ is a hydrogen, halogen, $C_{1-6}$ alkyl, aryl, nitrile group, nitro group, or sulfonate group;
   ii) $R^3$ is a hydrogen or $C_{1-6}$ alkyl;
   iv) each $R^4$ is independently a hydrogen, halogen, $C_{1-6}$ alkyl or aryl; and v) n is an integer from about 1 to about 6;

wherein the ink composition, after drying for one hour, has a wet-rub resistance of from 1 to 3.

2. An ink composition in accordance with claim 1, wherein said binder material encapsulates, covers or encapsulates and covers a colorant in said ink composition.

3. An ink composition in accordance with claim 1, wherein said ink composition is an ink jet ink composition.

4. An ink composition in accordance with claim 1, wherein said colorant is a dye.

5. An ink composition in accordance with claim 1, wherein said colorant is a pigment.

6. An ink composition in accordance with claim 1, wherein said binder material comprises the structural unit

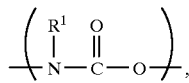

III wherein $R^1$ is a hydrogen, halogen, $C_{1-6}$ alkyl, aryl, nitrile group (CN), nitro group ($NO^2$) or sulfonate group ($SO_3R^3$); $R^3$ is a hydrogen or $C_{1-6}$ alkyl.

7. An ink composition in accordance with claim 6, wherein said binder material encapsulates, covers or encapsulates and covers a colorant in said ink composition.

8. An ink composition in accordance with claim 7, wherein said colorant is a dye.

9. An ink composition in accordance with claim 7, wherein said colorant is a pigment.

10. An ink composition in accordance with claim 9, wherein said pigment is dispersed with a dispersant.

11. An ink composition in accordance with claim 10, wherein said dispersant is a polymeric dispersant.

12. An ink composition in accordance with claim 11, wherein said polymeric dispersant is prepared from methacrylate, methacrylol-terminated polydimethylsiloxane and stearyl methacrylate in a 22:1:1 molar ratio, respectively.

13. An ink composition in accordance with claim 6, wherein said ink composition is an ink jet ink composition.

14. An ink composition in accordance with claim 6, wherein $R^1$ is hydrogen.

15. An ink composition in accordance with claim 1, wherein $R^4$ is hydrogen and t is 3.

16. An ink composition in accordance with claim 1, wherein said ink composition comprises a mixture of the terminal diol and the lactam, having a weight ratio of terminal diol:lactam at about 20:80 to about 80:20.

17. An ink composition according to claim 1, wherein the binder material comprises a structural unit having the formula:

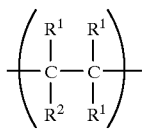

(I)

and a structural unit having the formula:

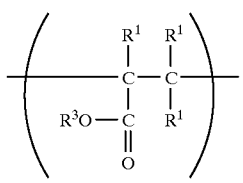

(II)

wherein each $R^1$, independently, and $R^2$ is a hydrogen, halogen, $C_{1-6}$ alkyl, aryl, nitrile group, nitro group, or sulfonate group; and $R^3$ is a hydrogen or $C_{1-6}$ alkyl.

18. An ink composition in accordance with claim 17, wherein $R^1$ is hydrogen, $R^2$ is chlorine and $R^3$ is hydrogen.

19. An ink composition in accordance with claim 1, wherein said binder material further comprises a structural unit represented as:

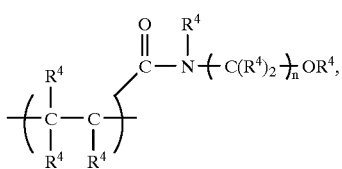

IV wherein each $R^4$ is independently a hydrogen, halogen, $C_{1-6}$ alkyl or aryl and n is an integer from about 1 to about 6.

20. An ink composition in accordance with claim 19, wherein $R^4$ is hydrogen.

21. An ink composition in accordance with claim 19, wherein said binder material comprises between about 60.0 to about 99.8 weight percent of the structural units represented by I, about 0.1 to about 30.0 weight percent of the structural units represented by II, and about 0.1 to about 10.0 weight percent of the structural units represented by IV.

22. An ink composition comprising:

a) from about 1.0% to about 5.0%, by weight, pigment;

b) from about 0.2% to about 4.0%, by weight, dispersant;

c) from about 25% to about 35%, by weight, of a solvent selected from the group consisting of bis-terminal diols, lactams and mixtures thereof; and d) from about 8.3% to about 10.12%, by weight, of a binder composition comprising from about 2.0% to about 50.0%, by weight of the binder composition, of a binder material having a structural unit selected from the group consisting of:

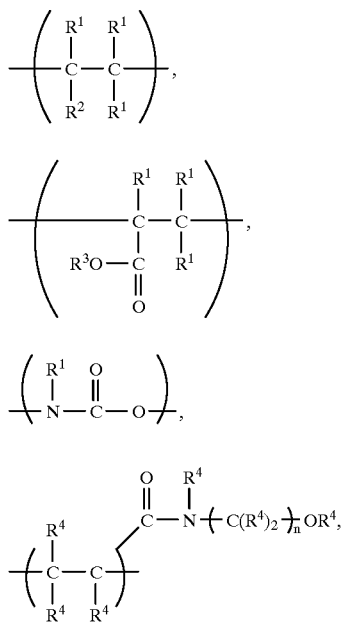

and mixtures thereof, wherein i) each $R^1$ is independently a hydrogen, halogen, $C_{1-6}$ alkyl, aryl, nitrile group, nitro group, or sulfonate group;

ii) $R^2$ is a hydrogen, halogen, $C_{1-6}$ alkyl, aryl, nitrile group, nitro group, or sulfonate group;

ii) $R^3$ is a hydrogen or $C_{1-6}$ alkyl;

iv) each $R^4$ is independently a hydrogen, halogen, $C_{1-6}$ alkyl or aryl; and v) n is an integer from about 1 to about 6;

wherein the ink composition, after drying for one hour, has a wet-rub resistance of from 1 to 3.

23. An ink composition according to claim 22, wherein the pigment is encapsulated by the binder material.

24. An ink composition according to claim 22, wherein the pigment is carbon black and the ink composition has an optical density of greater than about 1.18.

25. An ink composition according to claim 22, wherein the ink composition comprises a bis-terminal diol and a lactam in weight ratio of terminal diol:lactam of about 20:80 to about 80:20.

26. An ink composition according to claim 22, wherein the dispersant comprises:

i) at least one member selected from the group consisting of acrylates and methacrylates other than stearyl acrylate, stearyl methacrylate, lauryl acrylate and lauryl methacrylate;

ii) at least one member selected from the group consisting of acrylol-terminated polydialkysiloxanes and methacrylol-terminated polydialkylsiloxanes; and iii) at least one member selected from the group consisting of stearyl acrylate, stearyl methacrylate, lauryl acrylate and lauryl methacrylate.

27. An ink composition according to claim 26, wherein the dispersant comprises:

i) a methacrylate other than stearyl methacrylate and lauryl methacrylate;

ii) methacrylol-terminated polydialkylsiloxanes; and iii) stearyl methacrylate;

wherein the molar ratio of methacrylate:methacrylol-terminated polydialkylsiloxanes:stearyl methacrylate is about 22:1:1.

28. An ink composition according to claim 22, further comprising a humectant selected from the group consisting of glycerol, sorbitol, ethylene glycol ethers, propylene glycol ethers, and mixtures thereof.

29. An ink composition according to claim 22, further comprising a biocide.

30. An ink composition according to claim 22, comprising a bis-terminal diol having the formula:

wherein t is an integer from about 3 to about 7.

31. An ink composition according to claim 22, comprising a lactam, wherein the lactam is 2-pyrrolidinone.

32. An ink composition according to claim 22, wherein the binder material comprises a structural unit having the formula:

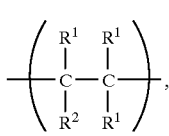

and a structural unit having the formula:

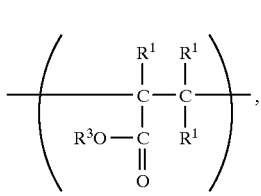

wherein each $R^1$, independently, and $R^2$ is a hydrogen, halogen, $C_{1-6}$ alkyl, aryl, nitrile group, nitro group, or sulfonate group; and $R^3$ is a hydrogen or $C_{1-6}$ alkyl.

33. An ink composition according to claim 22, wherein the binder material comprises a structural unit having the formula:

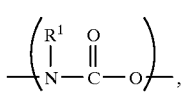

wherein $R^1$ is a hydrogen, halogen, $C_{1-6}$ alkyl, aryl, nitrile group, nitro group or sulfonate group.

34. A method of forming an ink composition, comprising the step of encapsulating a colorant with a binder material comprising a structural unit selected from the group consisting of:

15

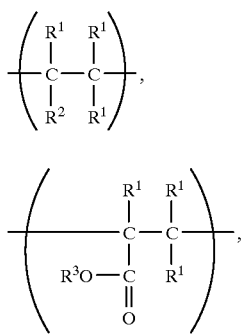

and mixtures thereof thereby forming an encapsulated colorant, wherein
  i) each $R^1$ is independently a hydrogen, halogen, $C_{1-6}$ alkyl, aryl, nitrile group, nitro group, or sulfonate group;
  ii) $R^2$ is a hydrogen, halogen, $C_{1-6}$ alkyl, aryl, nitrile group, nitro group, or sulfonate group; and
  ii) $R^3$ is a hydrogen or $C_{1-6}$ alkyl;
wherein the ink composition, after drying for one hour, has a wet-rub resistance of from 1 to 3.

35. A method of forming an ink composition according to claim 34, further comprising the step of mixing the encapsulated colorant with a solvent selected from the group consisting of bis-terminal diols, lactams and mixtures thereof.

36. A method of forming an ink composition according to claim 34, wherein the colorant is carbon black and the ink composition has an optical density of greater than about 1.18.

37. A method of forming an ink composition according to claim 34, wherein the binder material comprises a structural unit having the formula:

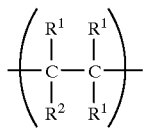 (I)

and a structural unit having the formula:

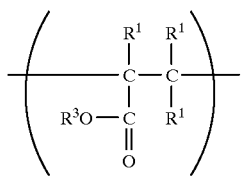 (II)

wherein each $R^1$, independently, and $R^2$ is a hydrogen, halogen, $C_{1-6}$ alkyl, aryl, nitrile group, nitro group, or sulfonate group; and $R^3$ is a hydrogen or $C_{1-6}$ alkyl.

38. A method of forming an ink composition according to claim 37, wherein the binder material further comprises a structural unit having the formula:

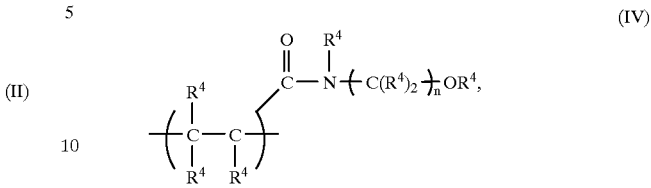 (IV)

wherein each $R^4$ is independently a hydrogen, halogen, $C_{1-6}$ alkyl or aryl and n is an integer from about 1 to about 6.

39. A method of improving the wet-rub resistance of an ink composition comprising a colorant; a bis-terminal diol having the formula:

$$HO(CH_2)_tOH$$

wherein t is an integer from about 3 to about 7; and a dispersant prepared with a precursor selected from the group consisting of methacrylates, methacryloyl-terminated polydimethylsiloxane and mixtures thereof;

comprising the step of adding to the ink composition a binder material comprising a structural unit selected from the group consisting of:

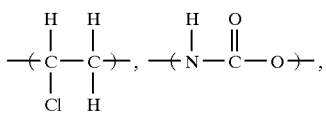

and mixtures thereof.

40. A method of improving the wet-rub resistance of an ink composition according to claim 39, wherein the colorant comprises a pigment.

41. A method of improving the wet-rub resistance of an ink composition according to claim 40, further comprising the step of adding 2-pyrrolidinone to the ink composition, and further wherein the bis-terminal diol is 1,3-propanediol.

42. A method of improving the wet-rub resistance of an ink composition according to claim 39, wherein the dispersant is prepared with a methacrylate other than stearyl methacrylate, methacryloyl-terminated polydimethylsiloxane and stearyl methacrylate.

43. A method of improving the wet-rub resistance of an ink composition according to claim 39, wherein the colorant is carbon black and the ink composition has an optical density of greater than about 1.18.

* * * * *